United States Patent
Sun et al.

(10) Patent No.: US 12,413,072 B2
(45) Date of Patent: Sep. 9, 2025

(54) PHOTOVOLTAIC ENERGY STORAGE AND POWER SYSTEM, AND THREE-PHASE POWER CONTROL METHOD, APPARATUS AND DEVICE FOR LOAD

(71) Applicant: Gree Electric Appliances, Inc. of Zhuhai, Guangdong (CN)

(72) Inventors: Yuxin Sun, Guangdong (CN); Songru Huang, Guangdong (CN); Meng Huang, Guangdong (CN); Yongjie Liu, Guangdong (CN); Hao Guo, Guangdong (CN); Yu Cui, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 0 days.

(21) Appl. No.: 18/698,884

(22) PCT Filed: Jul. 26, 2022

(86) PCT No.: PCT/CN2022/107834
§ 371 (c)(1),
(2) Date: Apr. 5, 2024

(87) PCT Pub. No.: WO2023/093097
PCT Pub. Date: Jun. 1, 2023

(65) Prior Publication Data
US 2024/0405562 A1    Dec. 5, 2024

(30) Foreign Application Priority Data
Nov. 29, 2021    (CN) .......................... 202111434967.7

(51) Int. Cl.
*H02J 3/38* (2006.01)
*H02J 3/28* (2006.01)

(52) U.S. Cl.
CPC .................. *H02J 3/38* (2013.01); *H02J 3/28* (2013.01); *H02J 2300/24* (2020.01)

(58) Field of Classification Search
CPC ............. H02J 3/38; H02J 3/28; H02J 2300/24
See application file for complete search history.

(56) References Cited

U.S. PATENT DOCUMENTS

| | | | |
|---|---|---|---|
| 2009/0189456 A1 | 7/2009 | Skutt | |
| 2012/0280566 A1* | 11/2012 | Umland | H02J 3/26 307/32 |

(Continued)

FOREIGN PATENT DOCUMENTS

| | | |
|---|---|---|
| CN | 104852394 A | 8/2015 |
| CN | 105406492 A | 3/2016 |

(Continued)

OTHER PUBLICATIONS

CN 202111434967.7, Notice of Registration Procedures, Jan. 8, 2025.

(Continued)

*Primary Examiner* — Carlos Amaya
(74) *Attorney, Agent, or Firm* — The Webb Law Firm

(57) ABSTRACT

This disclosure relates to a photovoltaic energy storage and power system and a three-phase power control method, apparatus and device for load(s). The three-phase power control method for load(s) in a photovoltaic energy storage and power system includes obtaining a drawing or feeding power of a grid, an charging or discharging power of energy storage, and a photovoltaic generation power; determining a generation power of an electric power system based on the drawing or feeding power of the grid, the charging or discharging power of the energy storage, and the photovoltaic generation power; and distributing the generation power (Continued)

of the electric power system evenly to load(s) of each phase to achieve three-phase dynamic balancing.

12 Claims, 4 Drawing Sheets

(56) References Cited

U.S. PATENT DOCUMENTS

| | | | |
|---|---|---|---|
| 2017/0047742 A1* | 2/2017 | Narla | H02J 3/381 |
| 2017/0302079 A1 | 10/2017 | Wyma | |
| 2020/0059099 A1 | 2/2020 | Turena et al. | |
| 2021/0296900 A1* | 9/2021 | Wanes | H02J 3/28 |

FOREIGN PATENT DOCUMENTS

| | | |
|---|---|---|
| CN | 106058916 A | 10/2016 |
| CN | 106684896 A | 5/2017 |
| CN | 105720594 B | 12/2017 |
| CN | 207490530 U | 6/2018 |
| CN | 108808711 A | 11/2018 |
| CN | 109599891 A | 4/2019 |
| CN | 109842136 A | 6/2019 |
| CN | 110783936 A | 2/2020 |
| CN | 111016721 A | 4/2020 |
| CN | 111561735 A | 8/2020 |
| CN | 111614109 A | 9/2020 |
| CN | 113258594 A | 8/2021 |
| CN | 114123255 A | 3/2022 |
| WO | 2019047514 A1 | 3/2019 |

OTHER PUBLICATIONS

EP 22897193, Extended European Search Report, Feb. 10, 2025.
CN 202111434967.7, First Office Action and Search Report, Sep. 23, 2023.
CN 202111434967.7, Second Office Action, Dec. 27, 2023.
Guo, Dongdong et al., "Design and Application of Automatic Balancing Device for Three-Phase Load", Inner Mongolia Electric Power, 2015, pp. 49-52, vol. 33, No. 05, Abstract.
PCT/CN2022/107834, International Search Report, Oct. 10, 2022.
PCT/CN2022/107834, Written Opinion, Oct. 10, 2022.

* cited by examiner

PHOTOVOLTAIC ENERGY STORAGE AND POWER SYSTEM, AND THREE-PHASE POWER CONTROL METHOD, APPARATUS AND DEVICE FOR LOAD

CROSS-REFERENCE TO RELATED APPLICATIONS

This application is the United States national phase of International Patent Application No. PCT/CN2022/107834, filed Jul. 26, 2022, and claims priority to Chinese Patent Application No. 202111434967.7, filed Nov. 29, 2021, the disclosures of which are hereby incorporated by reference in their entireties.

BACKGROUND OF THE INVENTION

Field of the Invention

This disclosure relates to the field of electric power control, in particular to a photovoltaic energy storage and power system and a three-phase power control method, apparatus and device for load(s).

Description of Related Art

The commonly used alternating current (AC) power transmission lines in the related technologies consist of a three-phase four-wire system comprising three phases A, B, C, and a neutral wire N. Taking the household power supply as an example, the working voltage is 220V AC, which is a voltage between a certain phase of the three phases and the neutral line.

SUMMARY OF THE INVENTION

According to an aspect of the present disclosure, there is provided a three-phase power control method for load(s) in a photovoltaic energy storage and power system, the method comprising:
   obtaining a drawing or feeding power of a grid, an charging or discharging power of energy storage, and a photovoltaic generation power;
   determining a generation power of an electric power system based on the drawing or feeding power of the grid, the charging or discharging power of the energy storage, and the photovoltaic generation power; and
   distributing the generation power of the electric power system evenly to load(s) of each phase to achieve three-phase dynamic balancing.

In some embodiments of the present disclosure, the obtaining the drawing or feeding power of the grid, the charging or discharging power of the energy storage, and the photovoltaic generation power comprises:
   obtaining the drawing or feeding power of the grid, the charging or discharging power of the energy storage, and the photovoltaic generation power by energy routers provided at a grid side, an energy storage device side and a photovoltaic device side of the photovoltaic energy storage and power system.

In some embodiments of the present disclosure, the distributing the generation power of the electric power system evenly to the load(s) of the each phase to achieve the three-phase dynamic balancing comprises:
   obtaining a consumption power of the load(s) of the each phase at an alternating current consumption power end by an energy router provided for the load(s) of the each phase at the alternating current consumption power end of the photovoltaic energy storage and power system; and
   distributing the consumption power of the load(s) of the each phase at the alternating current consumption power end of the photovoltaic energy storage and power system according to the generation power of the electric power system by the energy router provided for the load(s) of the each phase at the alternating current consumption power end.

In some embodiments of the present disclosure, the distributing the consumption power of the load(s) of the each phase at the alternating current consumption power end of the photovoltaic energy storage and power system according to the generation power of the electric power system comprises:
   equalizing consumption powers of load(s) of various phases at the alternating current consumption power end, the consumption power of the load(s) of the each phase being equal to one-third of the generation power of the electric power system.

In some embodiments of the present disclosure, the equalizing the consumption powers of the load(s) of the various phases at the alternating current consumption power end, the consumption power of the load(s) of the each phase being equal to one-third of the generation power of the electric power system comprises:
   for the load(s) of the each phase at the alternating current consumption power end, comparing a consumption power of the load(s) and the generation power of the electric power system;
   in response to the consumption power of the load(s) being greater than one-third of the generation power of the electric power system, reducing the consumption power of the load(s) by an energy router provided for the load(s), so that the consumption power of the load(s) is equal to one-third of the generation power of the electric power system; and
   in response to the consumption power of the load(s) being less than one-third of the generation power of the electric power system, increasing the consumption power of the load(s) by the energy router provided for the load(s), so that the consumption power of the load(s) is equal to one-third of the generation power of the electric power system.

According to an aspect of the present disclosure, there is provided a three-phase power control apparatus for load(s) in a photovoltaic energy storage and power system, the three-phase power control apparatus comprising:
   a power acquisition module for obtaining a drawing or feeding power of a grid, an charging or discharging power of energy storage, and a photovoltaic generation power;
   a generation power determination module for determining a generation power of an electric power system based on the drawing or feeding power of the grid, the charging or discharging power of the energy storage, and the photovoltaic generation power; and
   a power distribution module for distributing the generation power of the electric power system evenly to load(s) of each phase to achieve three-phase dynamic balancing.

In some embodiments of the present disclosure, the three-phase power control apparatus for load(s) in a photovoltaic energy storage and power system is used to perform the operations of the three-phase power control method for the load(s) in the photovoltaic energy storage and power system according to any of the above embodiments.

According to an aspect of the present disclosure, there is provided a three-phase power control apparatus for load(s) in a photovoltaic energy storage and power system, the apparatus comprising:
- a memory for storing instructions;
- a processor for executing the instructions to cause the three-phase power control apparatus for the load(s) in the photovoltaic energy storage and power system to perform operations of the three-phase power control method for load(s) in the photovoltaic energy storage and power system according to any of the above embodiments.

According to another aspect of the present disclosure, there is provided a three-phase power control device for load(s) in a photovoltaic energy storage and power system, comprising: energy routers provided for a grid side, an energy storage device side, a photovoltaic device side, and load(s) of each phase at an alternating current consumption power end; and
- the three-phase power control apparatus for load(s) in a photovoltaic energy storage and power system according to any of the above embodiments.

According to another aspect of the present disclosure, there is provided a photovoltaic energy storage and power system comprising the three-phase power control device for the load(s) in the photovoltaic energy storage and power system according to any of the above embodiments.

In some embodiments of the present disclosure, the photovoltaic energy storage and power system is a photovoltaic air conditioning system.

According to a further aspect of the present disclosure, there is provided a non-transitory computer-readable storage medium stored thereon computer instructions that, when executed by a processor, implement the three-phase power control method for load(s) in a photovoltaic energy storage and power system according to any of the above embodiments.

BRIEF DESCRIPTION OF THE DRAWINGS

In order to more clearly explain the embodiments of the present invention or the technical solutions in the prior art, a brief introduction will be given below for the drawings required to be used in the description of the embodiments or the prior art. It is obvious that, the drawings illustrated as follows are merely some embodiments of the present disclosure. For a person skilled in the art, he or she may also acquire other drawings according to such drawings on the premise that no inventive effort is involved.

DESCRIPTION OF THE INVENTION

Figure 1A:
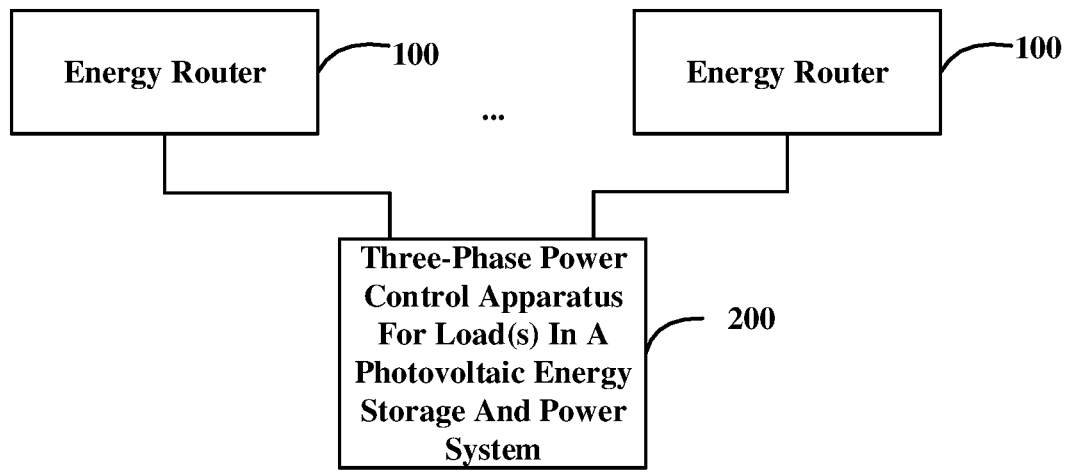
FIG. 1A is a schematic diagram of a three-phase power control device for load(s) in a photovoltaic energy storage and power system according to some embodiments of the present disclosure.

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments acquired by those of ordinary skill in the art based on the embodiments of the present disclosure without creative efforts shall fall within the protection scope of the present disclosure.

Unless otherwise specified, the relative arrangement, numerical expressions and values of the components and steps set forth in these examples do not limit the scope of the invention.

At the same time, it should be understood that, for ease of description, the dimensions of the various parts shown in the drawings are not drawn to actual proportions.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an item is defined in a drawing, there is no need for further discussion in the accompanying drawings.

The inventors found through research that measures for addressing three-phase imbalance occurred in power grids in the related technologies mainly comprise load phase sequence balancing and load compensation. The load phase sequence balancing algorithm can improve the three-phase imbalance caused by uneven load distribution, but it still has the following problems: short power outages during phase changes, which can affect the quality of power supply; sudden connections of load(s) to a different phase can affect the reliability of the system; manual adjustments to the phase sequence are required in low-voltage distribution systems. The load compensation method can quickly and effectively suppress the three-phase load imbalance in low-voltage distribution networks. However, the investment cost of load compensation devices and their maintenance in the related technologies is high, which makes it difficult to promote in some power supply areas such as residential, rural and other areas. As a result, it is difficult to promote the methods of the related technologies.

In the air conditioning systems powered by photovoltaic energy in the related technologies, the AC grid is connected in a three-phase, four-wire system, and single-phase 220V air conditioners are connected between a specific phase of the three phases and the neutral wire for consumption power. Due to the high randomness and high power consumption of air conditioning loads, there is often a situation where too many loads are applied to a particular phase, resulting in a significant difference in power consumption between different phases, ultimately leading to three-phase imbalance, which can reduce the reliability of the power system and cause potential safety hazards. The current solution in related technologies is to add load compensation devices as suppressors, but this method is costly, difficult to maintain, and not easy to promote.

Therefore, related technologies may encounter problems such as high load randomness, a large proportion of single-phase loads, and the problem of three-phase imbalance at the AC end caused by different load types and sudden increases in load consumption power, which in turn affect the safe operation of the entire power system.

In view of at least one of the foregoing technical problems, the present disclosure provides a method, apparatus and device for three-phase power control for load(s) in a photovoltaic energy storage and power system, which will be explained with reference to specific embodiments.

FIG. 1A is a schematic diagram of a three-phase power control device for load(s) in a photovoltaic energy storage and power system according to some embodiments of the present disclosure. As shown in FIG. 1A, the three-phase power control device for load(s) in a photovoltaic energy storage and power system of the present disclosure comprises energy routers 100 and a three-phase power control apparatus 200 for load(s) in the photovoltaic energy storage and power system, wherein:

a plurality of energy routers 100 are disposed at the grid side, the energy storage device side, and the photovoltaic device side, and are provided for load(s) of each phase at the AC power end.

The three-phase power control apparatus 200 for load(s) in the photovoltaic energy storage and power system is used for obtaining a drawing or feeding power of a grid, an charging or discharging power of energy storage, and a photovoltaic generation power; determining a generation power of an electric power system based on the drawing or feeding power of the grid, the charging or discharging power of the energy storage, and the photovoltaic generation power; and distributing the generation power of the electric power system evenly to load(s) of each phase to achieve three-phase dynamic balancing.

In some embodiments of the present disclosure, in a case where the power grid is in a drawing state, the drawing or feeding power of the grid is a drawing power.

In other embodiments of the present disclosure, in a case where the power grid is in a feeding state, the drawing or feeding power of the grid is a feeding power.

In some embodiments of the present disclosure, in a case where the energy storage device is in a charging state, the charging or discharging power of the energy storage is a charging power.

In other embodiments of the present disclosure, in a case where the energy storage device is in a discharging state, the charging or discharging power of the energy storage is a discharging power. In some embodiments of the present disclosure, the three-phase power control apparatus 200 for load(s) in the photovoltaic energy storage and power system may be used for obtaining the drawing or feeding power of the grid, the charging or discharging power of the energy storage, and the photovoltaic generation power using energy routers provided at the grid side, the energy storage device side, and the photovoltaic device side of the photovoltaic energy storage and power system, respectively.

In some embodiments of the present disclosure, the three-phase power control apparatus 200 for load(s) in the photovoltaic energy storage and power system may be used for obtaining consumption power of the load(s) of the each phase at an AC consumption power end by an energy router provided for the load(s) of the each phase at the AC consumption power end of the photovoltaic energy storage and power system; and distributing the consumption power of the load(s) of the each phase at the AC consumption power end of the photovoltaic energy storage and power system according to the generation power of the electric power system by the energy router provided for the load(s) of the each phase at the AC consumption power end.

In the present disclosure, the generation power of the electric power system is evenly distributed to load(s) of various phases to achieve three-phase dynamic balancing.

Figure 1B:
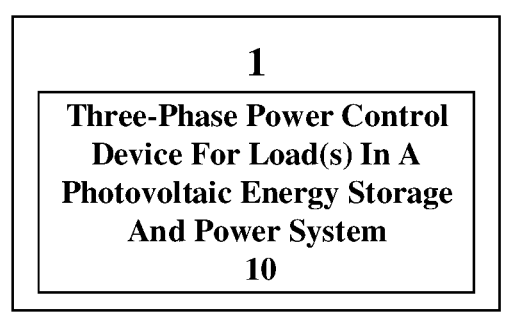
FIG. 1B is a schematic diagram of the photovoltaic energy storage and power system according to some embodiments of the present disclosure.

According to another aspect of the present disclosure, there is provided a photovoltaic energy storage and power system. FIG. 1B is a schematic diagram of the photovoltaic energy storage and power system according to some embodiments of the present disclosure. As shown in FIG. 1B, the photovoltaic energy storage and power system 1 of the present disclosure may comprise a three-phase power control device 10 for load(s) in the photovoltaic energy storage and power system as described in any embodiment of the present disclosure (such as the embodiment in FIG. 1A).

In some embodiments of the present disclosure, the photovoltaic energy storage and power system may be a photovoltaic air conditioning system.

In some embodiments of the present disclosure, the load(s) may be air conditioners.

Figure 2:
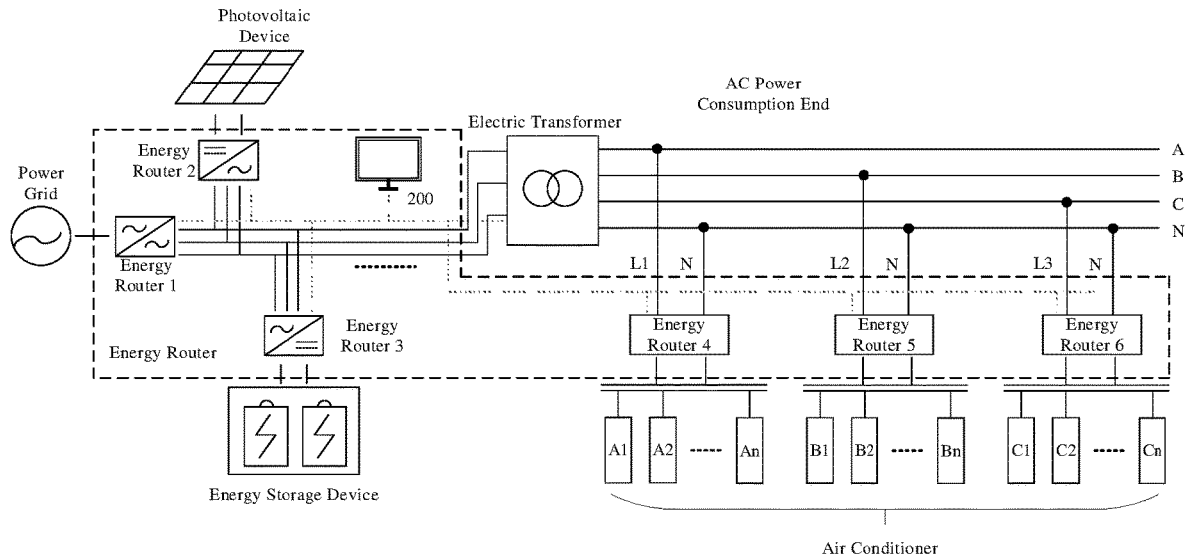
FIG. 2 is a schematic diagram of the photovoltaic energy storage and power system according to some embodiments of the present disclosure.

FIG. 2 is a schematic diagram of the photovoltaic energy storage and power system according to some embodiments of the present disclosure. In the embodiment shown in FIG. 2, the photovoltaic energy storage and power system is a photovoltaic air conditioning system; the load(s) are air conditioner(s).

As shown in FIG. 2, the photovoltaic air conditioning system comprises: a power grid, a photovoltaic device, an energy storage device, and an air conditioner.

FIG. 2 also shows a schematic diagram of a three-phase power control device for load(s) in a photovoltaic energy storage and power system according to other embodiments of the present disclosure. As shown in FIG. 2, the three-phase power control device (the device as shown in the dashed box in FIG. 2) for load(s) in a photovoltaic energy storage and power system of the present disclosure comprises a plurality of energy routers 1 to 6 and a three-phase power control apparatus 200 for load(s) in the photovoltaic energy storage and power system, wherein:

energy router 1 is provided at the grid side, energy router 2 is provided at the photovoltaic device side, and energy router 3 is provided at the energy storage device side. The energy routers 1 to 3 serves as energy interfaces for obtaining the drawing or feeding power of the grid, the photovoltaic generation power, and the charging or discharging power of energy storage.

In some embodiments of the present disclosure, the energy routers 100 of the embodiment in FIG. 1 are equivalent to the plurality of energy routers 1 to 6 of the embodiment in FIG. 2.

In some embodiments of the present disclosure, as shown in FIG. 2, energy routers 4 to 6 are additionally added to the front end of air-conditioning consumption power, which communicate with the three-phase power control apparatus 200 for load(s) in the photovoltaic energy storage and power system. The light dashed lines are communication lines.

In some embodiments of the present disclosure, as shown in FIG. 2, energy routers 4 to 6 are provided between each phase and its electrical load(s). For example, energy router 4 is located between phase A and the electrical loads (air conditioners A1, A2, . . . An); energy router 5 is located between phase B and the electrical loads (air conditioners B1, B2, . . . . Bn); energy router 6 is located between phase B and the electrical loads (air conditioners B1, B2, . . . Bn).

In some embodiments of the present disclosure, as shown in FIG. 2, energy routers 4 to 6 are added to the front end of the air conditioning consumption power system, which can be used to monitor the phase voltage, current, and other conditions in real time, and maintain power balance between phases.

In some embodiments of the present disclosure, energy routers 4-6 are used to control the flow of power, and in particular to monitor the power of the each phase in real time in cooperation with the three-phase power control apparatus 200 the for load(s) in the photovoltaic energy storage and power system, to determine whether the phase powers are dynamically balanced by comparing with the data of the energy routers 1 to 3, and to dynamically balance the phase powers by compensation or power limitation.

In some embodiments of the present disclosure, energy routers 4-6 can be used to compensate for a certain phase when its power is less than a power threshold that should be met for power balancing at that time; on the contrary, if the power of a certain phase is greater than the power threshold that should be met for power balancing at that time, the power of that phase is limited until the three-phase dynamic balancing is achieved.

The energy router of the above embodiments of the present disclosure mainly serves to monitor and distribute energy at the AC consumption power end, and can monitor power changes in real time to ensure a dynamic balance of power among the three phases.

For the AC power grid, the above embodiments of the present disclosure can reduce transformer losses and prevent misoperation of power grid protection components.

For the consumption power end, the above embodiments of the present disclosure can solve the technical problem of poor power quality caused by uneven distribution of electric load(s), and can also greatly reduce line losses and maintenance risks.

For the entire power system, the energy routers in the above embodiments of the present disclosure are autonomous, which can solve the technical problem of three-phase load imbalance caused by uneven distribution of air-conditioning load(s), thereby greatly improving system stability and eliminating safety hazards.

When a three-phase consumption power imbalance occurs on the power consumption side due to the uneven distribution of air conditioning load(s), the energy routers make an immediate response and adjustment to ensure the safe and reliable operation of the power system.

The above embodiments of the present disclosure can reduce the loss of lines of the system, reduce maintenance risks, and reduce safety hazards.

The above embodiments of the present disclosure eliminates the need for load compensation devices, thereby reducing power system costs, and is easy to maintain.

The above embodiments of the present disclosure is consistent with the goals of carbon peaking and carbon neutrality, and aims to build a new type of safe, stable, and reliable power network.

The three-phase power control method and apparatus for load(s) in the photovoltaic energy storage and power system will be introduced with reference to the following embodiments.

Figure 3:
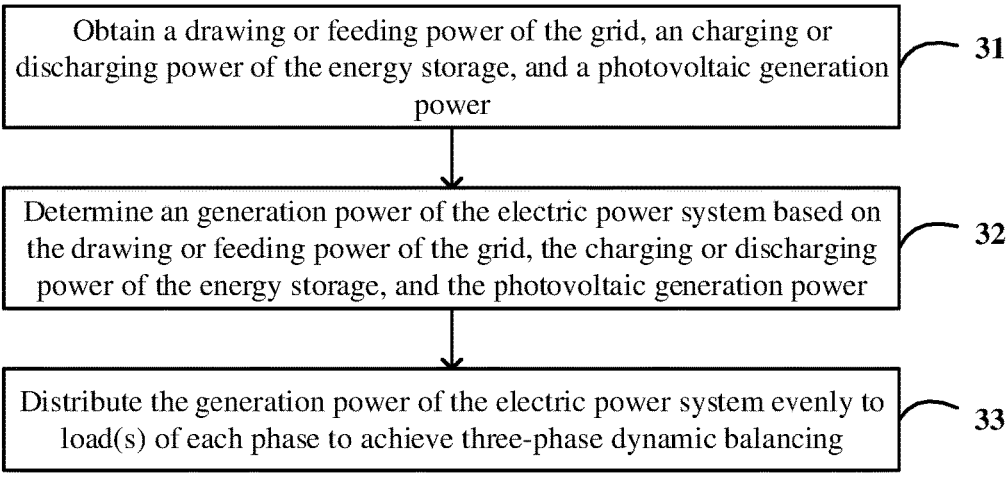
FIG. 3 is a schematic diagram of a three-phase power control method for load(s) in a photovoltaic energy storage and power system according to some embodiments of the present disclosure.

FIG. 3 is a schematic diagram of a three-phase power control method for load(s) in a photovoltaic energy storage and power system according to some embodiments of the present disclosure. Preferably, the method of the embodiments can be performed by the three-phase power control apparatus for load(s) in a photovoltaic energy storage and power system, the three-phase power control device for load(s) in a photovoltaic energy storage and power system, or the photovoltaic energy storage and power system of the present disclosure. This method may comprise at least one of steps 31 to 33.

In step 31, the three-phase power control apparatus for load(s) in the photovoltaic energy storage and power system obtains a drawing or feeding power of the grid, an charging or discharging power of the energy storage, and a photovoltaic generation power.

In some embodiments of the present disclosure, step 31 may comprise: obtaining the drawing or feeding power of the grid, the charging or discharging power of the energy storage, and the photovoltaic generation power by energy routers provided at a grid side, an energy storage device side and a photovoltaic device side of the photovoltaic energy storage and power system.

In some embodiments of the present disclosure, in a case where the power grid is in a drawing state, the drawing or feeding power of the grid is a drawing power.

In other embodiments of the present disclosure, in a case where the power grid is in a feeding state, the drawing or feeding power of the grid is a feeding power.

In some embodiments of the present disclosure, in a case where the energy storage device is in a charging state, the charging or discharging power of the energy storage is a charging power.

In other embodiments of the present disclosure, in a case where the energy storage device is in a discharging state, the charging or discharging power of the energy storage is a discharging power.

In step 32, the three-phase power control apparatus for load(s) in the photovoltaic energy storage and power system determines an generation power of the electric power system $P_x$ based on the drawing or feeding power of the grid $P_{gird}$, the charging or discharging power of the energy storage $P_{st}$, and the photovoltaic generation power $P_{pv}$.

In some embodiments of the present disclosure, step 32 may comprises: determining the generation power of the electric power system $P_x$ based on a sum of the drawing or feeding power of the grid $P_{gird}$, the charging or discharging power of the energy storage $P_{st}$, and the photovoltaic generation power $P_{pv}$, as shown in formula (1).

$$P_{gird} + P_{st} + P_{pv} = P_x = x(\text{kW}) \quad (1)$$

In formula (1), the generation power of the electric power system $P_x$ is x(kW).

In step 33, the three-phase power control apparatus for load(s) in the photovoltaic energy storage and power system distributes the generation power of the electric power system evenly to load(s) of each phase to achieve three-phase dynamic balancing.

In some embodiments of the present disclosure, step 33 may comprises: monitoring a consumption power of each phase of air conditioner power consumption end by an energy router provided for load(s) of that phase at an AC consumption power end of the photovoltaic energy storage and power system, and returning the data for comparison.

In some embodiments of the present disclosure, step 33 may comprises: obtaining a consumption power of the load(s) of the each phase at an AC consumption power end from an energy router provided for the load(s) of the each phase at the AC consumption power end of the photovoltaic energy storage and power system; and distributing the consumption power of the load(s) of the each phase at the AC consumption power end of the photovoltaic energy storage and power system according to the generation power of the electric power system by the energy router provided for the load(s) of the each phase at the AC consumption power end.

In some embodiments of the present disclosure, the distributing the consumption power of the load(s) of the each phase at the AC consumption power end of the photovoltaic energy storage and power system according to the generation power of the electric power system comprises: equalizing consumption powers of load(s) of various phases ($P_A$, $P_B$, $P_C$) at the alternating current consumption power end, the consumption power of the load(s) of the each phase being equal to one-third of the generation power of the electric power system, as shown in formula (2).

$$P_A = P_B = P_C = \frac{x}{3}(kW) \qquad (2)$$

In some embodiments of the present disclosure, the equalizing the consumption powers of the load(s) of the various phases at the alternating current consumption power end, the consumption power of the load(s) of the each phase being equal to one-third of the generation power of the electric power system comprises: for the load(s) of the each phase at the alternating current consumption power end, comparing a consumption power of the load(s) and the generation power of the electric power system; in response to the consumption power of the load(s) being greater than one-third of the generation power of the electric power system, reducing the consumption power of the load(s) by an energy router provided for the load(s), so that the consumption power of the load(s) is equal to one-third of the generation power of the electric power system; and in response to the consumption power of the load(s) being less than one-third of the generation power of the electric power system, increasing the consumption power of the load(s) by the energy router provided for the load(s), so that the consumption power of the load(s) is equal to one-third of the generation power of the electric power system.

Figure 4:
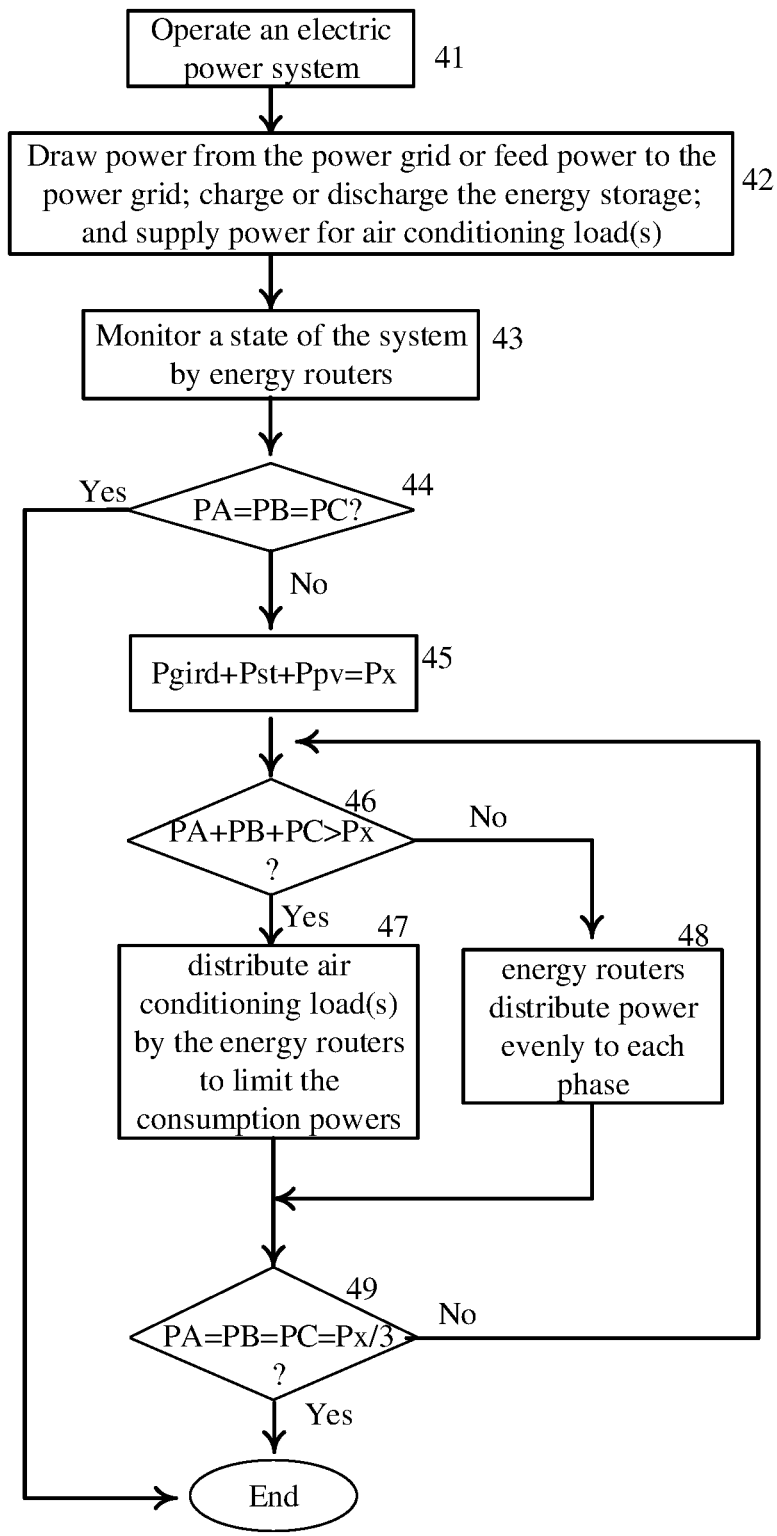
FIG. 4 is a schematic diagram of a three-phase power control method for load(s) in a photovoltaic energy storage and power system according to other embodiments of the present disclosure.

FIG. 4 is a schematic diagram of a three-phase power control method for load(s) in a photovoltaic energy storage and power system according to other embodiments of the present disclosure. Preferably, the method of the embodiments can be performed by the three-phase power control apparatus for load(s) in a photovoltaic energy storage and power system, the three-phase power control device for load(s) in a photovoltaic energy storage and power system, or the photovoltaic energy storage and power system of the present disclosure. This method may comprise at least one of steps 41 to 49.

Step 41 comprises operating an electric power system.

Step 42 comprises drawing power from the power grid or feeding power to the power grid; charging or discharging the energy storage; and supplying power for load(s) (such as air conditioning load(s)).

Step 43 comprises monitoring a state of the system by energy routers in real time.

Step 44 comprises determining whether the consumption powers of the load(s) of the various phases at the AC consumption power end are equal, as shown in formula (3), wherein if the consumption powers of the load(s) of the various phases at the AC consumption power end are equal, the method ends; otherwise, if the consumption powers of the load(s) of the various phases at the AC consumption power end are not equal, the method proceeds to step 45.

$$P_A = P_B = P_C \qquad (3)$$

Step 45 comprises obtaining a drawing or feeding power of the grid, an charging or discharging power of the energy storage, and a photovoltaic generation power; determining the generation power of the electric power system $P_x$ based on a sum of the drawing or feeding power of the grid $P_{grid}$, the charging or discharging power of the energy storage $P_{st}$, and the photovoltaic generation power $P_{pv}$, as shown in formula (1).

Step 46 comprises determining whether the sum of the consumption powers of the load(s) of the various phases at the AC consumption power end is greater than the generation power of the electric power system. If the sum of the consumption powers of the load(s) of the various phases at the AC consumption power end is greater than the generation power of the electric power system, as shown in formula (4), the method proceeds to step 47; otherwise, if the sum of the consumption powers of the load(s) of the various phases at the AC consumption power end is less than the generation power of the electric power system, as shown in formula (5), the method proceeds to step 48.

Step 47 comprises distributing load(s) (such as air conditioning load(s)) by the energy routers to limit the consumption powers. The method then proceeds to step 49.

In some embodiments of the present disclosure, step 47 may comprise: in a case of insufficient energy storage or photovoltaic power generation, as shown in formula (4):

$$P_A + P_B + P_C > P_x \qquad (4)$$

Excessive air-conditioning load or a sudden increase in air-conditioning load on a particular phase of the AC consumption power end can cause three-phase imbalance. To ensure the safe and stable operation of the power grid and the entire power system, controls are introduced by the energy routers to equalize the power distribution for the three phases until the three phases are dynamically balanced.

In step 48, the energy routers distribute power evenly to each phase; and then step 49 is performed.

In some embodiments of the present disclosure, step 48 may comprise: in a case of sufficient energy storage or photovoltaic power generation, as shown in formula (5):

$$P_A + P_B + P_C < P_x \qquad (5)$$

By management of the energy routing system, the powers of the three phases is evenly distributed to the air conditioning load(s) of each phase to achieve a three-phase balance.

Step 49 comprises equalizing the load consumption power of each phase at the AC consumption power end to one-third of the generation power of the electric power system, as shown in formula (2).

In some embodiments of the present disclosure, in a case of balanced three phases on the AC side, the power of each phase should satisfy either formula (2) or formula (3).

In some embodiments of the present disclosure, the three-phase power control method for load(s) in a photovoltaic energy storage and power system may comprise: after step 49, if a balance is reached (formula (2) or: formula (3)), the method ends; otherwise, the energy routers continue to detect and adjust until a balance is reached.

In some embodiments of the present disclosure, in the case of formula (1), the following 8 situations may exist when the three-phase power is unbalanced:

$$P_A < \frac{P_x}{3}, P_B < \frac{P_x}{3}, P_C < \frac{P_x}{3} \quad \text{①}$$

$$P_A < \frac{P_x}{3}, P_B < \frac{P_x}{3}, P_C > \frac{P_x}{3} \quad \text{②}$$

$$P_A < \frac{P_x}{3}, P_B > \frac{P_x}{3}, P_C < \frac{P_x}{3} \quad \text{③}$$

$$P_A < \frac{P_x}{3}, P_B > \frac{P_x}{3}, P_C > \frac{P_x}{3} \quad \text{④}$$

$$P_A > \frac{P_x}{3}, P_B < \frac{P_x}{3}, P_C < \frac{P_x}{3} \quad \text{⑤}$$

$$P_A > \frac{P_x}{3}, P_B < \frac{P_x}{3}, P_C > \frac{P_x}{3} \quad \text{⑥}$$

$$P_A > \frac{P_x}{3}, P_B > \frac{P_x}{3}, P_C < \frac{P_x}{3} \quad \text{⑦}$$

$$P_A > \frac{P_x}{3}, P_B > \frac{P_x}{3}, P_C > \frac{P_x}{3} \quad \text{⑧}$$

For situation ①, in order to obtain a three-phase balance, it is necessary to increase the power of each of phases A, B and C. For situation ②, the powers are increased for phases A and B and is reduced for phase C. Similar adjustment methods are also used for situations ③ to ⑧, which will not be repeated here.

The three-phase power control method for load(s) in a photovoltaic energy storage and power system will be introduced with reference to the following embodiments.

In some embodiments of the present disclosure, the final generation power of the power system is 120 KW and the load power of each phase is shown in Table 1.

TABLE 1

| Phase | Load Power kW |
|---|---|
| Phase A | 40 |
| Phase B | 30 |
| Phase C | 5 |

The air-conditioning load power of phase A is too high, and the uneven consumption power of each phase leads to a serious three-phase imbalance. In this case, $P_A \neq P_B \neq P_C$, $P_A + P_B + P_C < P_x$. After adjustment of the energy routers, $$P_A = P_B = P_C = \frac{P_x}{3} = 40(\text{kW})$$

to achieve dynamic balancing of the three-phase load power, and then the adjustment is complete.

In other embodiments of the present disclosure, the final generation power of the power system is 72 kW, and $P_A \neq P_B \neq P_C$, $P_A + P_B + P_C > P_x$. The energy routers act to limit the air-conditioning consumption power of each phase to $$P_A = P_B = P_C = \frac{P_x}{3} = 24(\text{kW}).$$

In the present disclosure, the power outputs of phases A and B can be limited by the energy routers, so as to reduce the power from 40 kW and 30 kW to 24 kW for phases A and B, while compensating for the power of phase C by increasing it from 5 kW to 24 kW, thereby achieving a three-phase power balance.

The three-phase power control method for load(s) in a photovoltaic energy storage and power system provided based on the above embodiment is a control method for energy routers in a photovoltaic energy air conditioning system. In the above embodiment of the present disclosure, balanced power distribution between respective phases on the AC side can be maintained by monitoring, distributing and protective control of the energy routers, and then dynamic power balance is achieved between the power grid, the photovoltaic device, the energy storage and the air conditioners to realize safe and stable operation of the entire power system.

In some embodiments of the present disclosure, energy routers are added to the front end of the air-conditioning consumption power system, which can be used to monitor the phase voltage, current, and other conditions in real time, and maintain power balance between phases.

The above embodiment of the present disclosure can realize convenient and flexible adjustment on the three-phase consumption power side.

Figure 5:
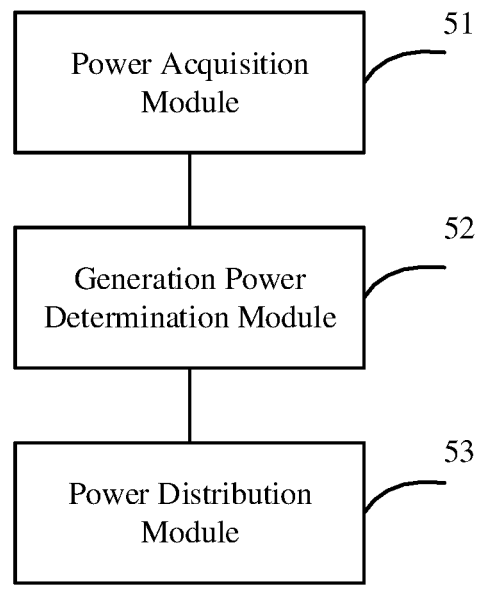
FIG. 5 is a schematic diagram of a three-phase power control apparatus for load(s) in a photovoltaic energy storage and power system according to some embodiments of the present disclosure.

FIG. 5 is a schematic diagram of a three-phase power control apparatus for load(s) in a photovoltaic energy storage and power system according to some embodiments of the present disclosure. As shown in FIG. 5, the three-phase power control apparatus for load(s) in a photovoltaic energy storage and power system of the present disclosure comprises a power acquisition module 51, a generation power determination module 52 and a power distribution module 53, wherein:

the power acquisition module 51 is used for obtaining a drawing or feeding power of a grid, an charging or discharging power of energy storage, and a photovoltaic generation power.

In some embodiments of the present disclosure, the power acquisition module 51 may be used for obtaining the drawing or feeding power of the grid, the charging or discharging power of the energy storage, and the photovoltaic generation power by energy routers provided at a grid side, an energy storage device side and a photovoltaic device side of the photovoltaic energy storage and power system.

The generation power determination module 52 is used for determining a generation power of an electric power system based on the drawing or feeding power of the grid, the charging or discharging power of the energy storage, and the photovoltaic generation power.

The power distribution module 53 is used for distributing the generation power of the electric power system evenly to load(s) of each phase to achieve three-phase dynamic balancing.

In some embodiments of the present disclosure, the power distribution module 53 may be used for obtaining a consumption power of the load(s) of the each phase at an alternating current consumption power end by an energy router provided for the load(s) of the each phase at the alternating current consumption power end of the photovoltaic energy storage and power system; and distributing the consumption power of the load(s) of the each phase at the alternating current consumption power end of the photovoltaic energy storage and power system according to the generation power of the electric power system by the energy router provided for the load(s) of the each phase at the alternating current consumption power end.

In some embodiments of the present disclosure, the power distribution module 53 may be used for equalizing consumption powers of load(s) of various phases at the alternating current consumption power end, the consumption power of the load(s) of the each phase being equal to one-third of the generation power of the electric power system.

In some embodiments of the present disclosure, the power distribution module 53 may be used for, for the load(s) of the each phase at the alternating current consumption power end, comparing a consumption power of the load(s) and the generation power of the electric power system; in response to the consumption power of the load(s) being greater than one-third of the generation power of the electric power system, reducing the consumption power of the load(s) by an energy router provided for the load(s), so that the consumption power of the load(s) is equal to one-third of the generation power of the electric power system; and in response to the consumption power of the load(s) being less than one-third of the generation power of the electric power system, increasing the consumption power of the load(s) by the energy router provided for the load(s), so that the consumption power of the load(s) is equal to one-third of the generation power of the electric power system.

In some embodiments of the present disclosure, the three-phase power control apparatus for load(s) in a photovoltaic energy storage and power system is used to perform the operations of the three-phase power control method for load(s) in a photovoltaic energy storage and power system according to any of the above embodiments (e.g., the embodiment of FIG. 3 or 4).

The energy router(s) of the above embodiment of the present disclosure mainly serves to monitor and distribute power at the AC consumption power end, and can monitor power changes in real time to ensure a dynamic balance of power among the three phases.

For the AC power grid, the above embodiments of the present disclosure can reduce transformer losses and prevent misoperation of power grid protection components.

For the power consumption end, the above embodiments of the present disclosure can solve the technical problem of poor power quality caused by uneven distribution of electric load(s), and can also greatly reduce line losses and maintenance risks.

For the entire power system, the energy routers in the above embodiments of the present disclosure are autonomous, which can solve the technical problem of three-phase load imbalance caused by uneven distribution of air-conditioning load(s), thereby greatly improving system stability and eliminating safety hazards.

Figure 6:
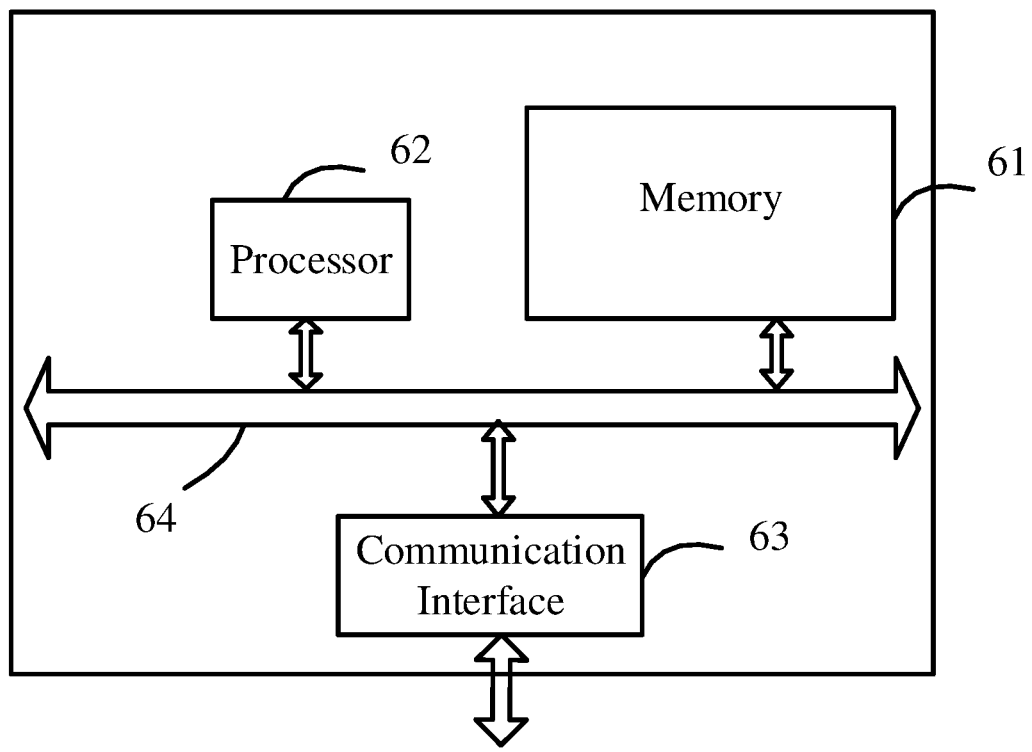
FIG. 6 is a schematic structural diagram of a three-phase power control apparatus for load(s) in a photovoltaic energy storage and power system according to other embodiments of the present disclosure.

FIG. 6 is a schematic structural diagram of a three-phase power control apparatus for load(s) in a photovoltaic energy storage and power system according to other embodiments of the present disclosure. As shown in FIG. 6, the three-phase power control apparatus for load(s) in a photovoltaic energy storage and power system comprises a memory 61 and a processor 62.

The memory 61 is used to store instructions. The processor 62 is coupled to the memory 61, and is configured to, based on instructions stored in the memory, carry out a method involved in the above embodiments (e.g., the embodiment of FIG. 3 or 4).

As shown in FIG. 6, the three-phase power control apparatus for load(s) in a photovoltaic energy storage and power system further comprises a communication interface 63 for performing information interaction with other devices. In addition, the three-phase power control apparatus for load(s) in a photovoltaic energy storage and power system further comprises a bus 64. The processor 62, the communication interface 63, and the memory 61 perform communication with each other through the bus 64.

The memory 61 may include a high speed RAM memory, and may also include a non-volatile memory such as at least one disk storage device. The memory 61 may also be a memory array. The memory 61 may also be partitioned into blocks, which may be combined into virtual volumes according to a certain rule.

In addition, the processor 62 may be a central processing unit (CPU), or may be an Application Specific Integrated Circuit (ASIC) or one or more integrated circuits configured to implement the embodiments of the present disclosure.

The three-phase power control apparatus for load(s) in a photovoltaic energy storage and power system may be implemented as a computer apparatus.

When a three-phase consumption power imbalance occurs on the power side due to the uneven distribution of air conditioning load(s), the energy routers make an immediate response and adjustment to ensure the safe and reliable operation of the power system.

The above embodiments of the present disclosure can reduce the line loss of the system, reduce maintenance risks, and reduce safety hazards.

The above embodiments of the present disclosure eliminates the need for load compensation devices, thereby reducing power system costs, and is easy to maintain.

The above embodiments of the present disclosure is consistent with the goals of carbon peaking and carbon neutrality, and aims to build a new type of safe, stable, and reliable power network.

In some embodiments of the present disclosure, energy routers are added to the front end of the air-conditioning consumption power system, which can be used to monitor the phase voltage, current, and other conditions in real time, and maintain power balance between phases.

The above embodiments of the present disclosure can realize convenient and flexible distribution on the three-phase consumption power side.

According to a further aspect of the present disclosure, there is provided a non-transitory computer-readable storage medium stored thereon computer instructions that, when executed by a processor, implement the three-phase power control method for load(s) in a photovoltaic energy storage and power system according to any of the above embodiments (e.g., the embodiment of FIG. 3 or 4).

In the above embodiments of the present disclosure, balanced power distribution between respective phases on the AC side can be maintained by monitoring, distributing and protective control of the energy routers, and then dynamic power balance is achieved between the power grid, the photovoltaic device, the energy storage device and the air conditioners to realize safe and stable operation of the entire power system.

One: skilled in the art should understand that, the embodiments of the present disclosure may be provided as a method, an apparatus, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disk storage, CD-ROM, optical storage device, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing apparatus to generate a machine such that the instructions executed by a processor of a computer or other programmable data processing apparatus to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable storage device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The three-phase power control apparatus for load(s) in a photovoltaic energy storage and power system described above may be implemented as a general-purpose processor for performing the functions described in this application, Programmable logic controller (PLC), digital signal processor (DSP), application specific integrated circuit (ASIC), field programmable gate array (FPGA) or other programmable logic devices, discrete gates or transistor logic devices, discrete hardware components or any appropriate combination thereof.

Heretofore, the present disclosure has been described in detail. In order to avoid obscuring the concepts of the present disclosure, some details known in the art are not described. Based on the above description, those skilled in the art can understand how to implement the technical solutions disclosed herein.

A person skilled in the art can understand that all or part of the steps for carrying out the method in the above embodiments can be completed by hardware or a program instructing the related hardware, wherein the program can be stored in a non-transitory computer readable storage medium. The storage medium may be a read-only memory (ROM), a magnetic disk or a compact disk (CD).

The above description of this invention is given for illustration and description, but is not exhaustive and is not intended to limit the present invention to the form disclosed herein. Various modifications and variations are apparent for a person of ordinary skill in the art. Embodiments are selected and described for a better illustration of the principle and practical application of this invention, so that those skilled in the art can understand this invention and envisage various embodiments with various modifications suited to specific usages.

What is claimed is:

1. A three-phase power control method for load(s) in a photovoltaic energy storage and power system, comprising:
    obtaining a drawing or feeding power of a grid, a charging or discharging power of energy storage, and a photovoltaic generation power;
    determining a generation power of an electric power system based on the drawing or feeding power of the grid, the charging or discharging power of the energy storage, and the photovoltaic generation power; and
    distributing the generation power of the electric power system evenly to load(s) of each phase to achieve three-phase dynamic balancing;
    wherein the distributing the generation power of the electric power system evenly to the load(s) of the each phase to achieve the three-phase dynamic balancing comprises:
    obtaining a consumption power of the load(s) of the each phase at an alternating current consumption power end by an energy router provided for the load(s) of the each phase at the alternating current consumption power end of the photovoltaic energy storage and power system; and
    distributing the consumption power of the load(s) of the each phase at the alternating current consumption power end of the photovoltaic energy storage and power system according to the generation power of the electric power system by the energy router provided for the load(s) of the each phase at the alternating current consumption power end, comprising:
        equalizing consumption powers of load(s) of various phases at the alternating current consumption power end, the consumption power of the load(s) of the each phase being equal to one-third of the generation power of the electric power system.

2. The three-phase power control method for the load(s) in the photovoltaic energy storage and power system according to claim 1, wherein the obtaining the drawing or feeding power of the grid, the charging or discharging power of the energy storage, and the photovoltaic generation power comprises:
    obtaining the drawing or feeding power of the grid, the charging or discharging power of the energy storage, and the photovoltaic generation power by energy routers provided at a grid side, an energy storage device side and a photovoltaic device side of the photovoltaic energy storage and power system.

3. The three-phase power control method for the load(s) in the photovoltaic energy storage and power system according to claim 1, wherein the equalizing the consumption powers of the load(s) of the various phases at the alternating current consumption power end, the consumption power of the load(s) of the each phase being equal to one-third of the generation power of the electric power system comprises:
for the load(s) of the each phase at the alternating current consumption power end, comparing a consumption power of the load(s) and the generation power of the electric power system;
in response to the consumption power of the load(s) being greater than one-third of the generation power of the electric power system, reducing the consumption power of the load(s) by an energy router provided for the load(s), so that the consumption power of the load(s) is equal to one-third of the generation power of the electric power system; and
in response to the consumption power of the load(s) being less than one-third of the generation power of the electric power system, increasing the consumption power of the load(s) by the energy router provided for the load(s), so that the consumption power of the load(s) is equal to one-third of the generation power of the electric power system.

4. A three-phase power control apparatus for load(s) in a photovoltaic energy storage and power system, comprising:
a memory for storing instructions;
a processor for executing the instructions to cause the three-phase power control apparatus for the load(s) in the photovoltaic energy storage and power system to perform operations of a three-phase power control method for the load(s) in the photovoltaic energy storage and power system comprising:
obtaining a drawing or feeding power of a grid, a charging or discharging power of energy storage, and a photovoltaic generation power;
determining a generation power of an electric power system based on the drawing or feeding power of the grid, the charging or discharging power of the energy storage, and the photovoltaic generation power; and
distributing the generation power of the electric power system evenly to load(s) of each phase to achieve three-phase dynamic balancing;
wherein the distributing the generation power of the electric power system evenly to the load(s) of the each phase to achieve the three-phase dynamic balancing comprises:
obtaining a consumption power of the load(s) of the each phase at an alternating current consumption power end by an energy rooter provided for the load(s) of the each phase at the alternating current consumption power end of the photovoltaic energy storage and power system; and
distributing the consumption power of the load(s) of the each phase at the alternating current consumption power end of the photovoltaic energy storage and power system according to the generation power of the electric power system by the energy router provided for the load(s) of the each phase at the alternating current consumption power end, comprising:
equalizing consumption powers of load(s) of various phases at the alternating current consumption power end, the consumption power of the load(s) of the each phase being equal to one-third of the generation power of the electric power system.

5. A three-phase power control device for load(s) in a photovoltaic energy storage and power system, comprising:
energy routers provided for a grid side, an energy storage device side, a photovoltaic device side, and load(s) of each phase at an alternating current consumption power end; and
the three-phase power control apparatus for load(s) in a photovoltaic energy storage and power system according to claim 4.

6. A photovoltaic energy storage and power system comprising the three-phase power control device for the load(s) in the photovoltaic energy storage and power system according to claim 5.

7. The photovoltaic energy storage and power system according to claim 6, wherein the photovoltaic energy storage and power system is a photovoltaic air conditioning system.

8. A non-transitory computer-readable storage medium having stored thereon computer instructions that, when executed by a processor, implement the three-phase power control method for the load(s) in the photovoltaic energy storage and power system comprising:
obtaining a drawing or feeding power of a grid, a charging or discharging power of energy storage, and a photovoltaic generation power;
determining a generation power of an electric power system based on the drawing or feeding power of the grid, the charging or discharging power of the energy storage, and the photovoltaic generation power; and
distributing the generation power of the electric power system evenly to load(s) of each phase to achieve three-phase dynamic balancing;
wherein the distributing the generation power of the electric power system evenly to the load(s) of the each phase to achieve the three-phase dynamic balancing comprises:
obtaining a consumption power of the load(s) of the each phase at an alternating current consumption power end by an energy router provided for the load(s) of the each phase at the alternating current consumption power end of the photovoltaic energy storage and power system; and
distributing the consumption power of the load(s) of the each phase at the alternating current consumption power end of the photovoltaic energy storage and power system according to the generation power of the electric power system by the energy router provided for the load(s) of the each phase at the alternating current consumption power end, comprising:
equalizing consumption powers of load(s) of various phases at the alternating current consumption power end, the consumption power of the load(s) of the each phase being equal to one-third of the generation power of the electric power system.

9. The three-phase power control apparatus according to claim 4, wherein the processor is further configured to:
obtain the drawing or feeding power of the grid, the charging or discharging power of the energy storage, and the photovoltaic generation power by energy routers provided at a grid side, an energy storage device side and a photovoltaic device side of the photovoltaic energy storage and power system.

10. The three-phase power control apparatus according to claim 4, wherein the processor is further configured to:
   for the load(s) of the each phase at the alternating current consumption power end, compare a consumption power of the load(s) and the generation power of the electric power system;
   in response to the consumption power of the load(s) being greater than one-third of the generation power of the electric power system, reduce the consumption power of the load(s) by an energy router provided for the load(s), so that the consumption power of the load(s) is equal to one-third of the generation power of the electric power system; and
   in response to the consumption power of the load(s) being less than one-third of the generation power of the electric power system, increase the consumption power of the load(s) by the energy router provided for the load(s), so that the consumption power of the load(s) is equal to one-third of the generation power of the electric power system.

11. The non-transitory computer-readable storage medium according to claim 8, wherein the obtaining the drawing or feeding power of the grid, the charging or discharging power of the energy storage, and the photovoltaic generation power comprises:
   obtaining the drawing or feeding power of the grid, the charging or discharging power of the energy storage, and the photovoltaic generation power by energy routers provided at a grid side, an energy storage device side and a photovoltaic device side of the photovoltaic energy storage and power system.

12. The non-transitory computer-readable storage medium according to claim 8, wherein the equalizing the consumption powers of the load(s) of the various phases at the alternating current consumption power end, the consumption power of the load(s) of the each phase being equal to one-third of the generation power of the electric power system comprises:
   for the load(s) of the each phase at the alternating current consumption power end, comparing a consumption power of the load(s) and the generation power of the electric power system;
   in response to the consumption power of the load(s) being greater than one-third of the generation power of the electric power system, reducing the consumption power of the load(s) by an energy router provided for the load(s), so that the consumption power of the load(s) is equal to one-third of the generation power of the electric power system; and
   in response to the consumption power of the load(s) being less than one-third of the generation power of the electric power system, increasing the consumption power of the load(s) by the energy router provided for the load(s), so that the consumption power of the load(s) is equal to one-third of the generation power of the electric power system.

* * * * *

UNITED STATES PATENT AND TRADEMARK OFFICE
CERTIFICATE OF CORRECTION

PATENT NO. : 12,413,072 B2
APPLICATION NO. : 18/698884
DATED : September 9, 2025
INVENTOR(S) : Yuxin Sun et al.

Page 1 of 1

It is certified that error appears in the above-identified patent and that said Letters Patent is hereby corrected as shown below:

In the Claims

Column 17, Line 52, Claim 4, delete "rooter" and insert -- router --

Signed and Sealed this
Twenty-first Day of October, 2025

John A. Squires
*Director of the United States Patent and Trademark Office*